United States Patent [19]
Ikeda

[11] Patent Number: 5,889,558
[45] Date of Patent: Mar. 30, 1999

[54] VARIABLE BLACK LEVEL BIAS IMAGE DISPLAY

[75] Inventor: Hiroaki Ikeda, Tokyo, Japan

[73] Assignee: NEC Corporation, Tokyo, Japan

[21] Appl. No.: 962,297

[22] Filed: Oct. 31, 1997

[30] Foreign Application Priority Data

Oct. 31, 1996 [JP] Japan ................................ 8-290925

[51] Int. Cl.⁶ .......................................................... H04N 5/59
[52] U.S. Cl. .......................... 348/380; 348/173; 348/377
[58] Field of Search .................................... 348/222, 257, 348/689, 690, 691, 692, 693, 694, 695, 696, 173, 377, 379, 380, 177; 351/1, 384

[56] References Cited

U.S. PATENT DOCUMENTS 5,416,533  5/1995  Kageyama .............................. 348/673

FOREIGN PATENT DOCUMENTS

| | | |
|---|---|---|
| 56-7575 | 1/1981 | Japan . |
| 56-114171 | 9/1981 | Japan . |
| 62-20491 | 1/1987 | Japan . |
| 62-142477 | 6/1987 | Japan . |
| 63-224486 | 9/1988 | Japan . |

*Primary Examiner*—Andrew I. Faile
*Assistant Examiner*—Habte Bahgi
*Attorney, Agent, or Firm*—Foley & Lardner

[57] ABSTRACT

An image display is disclosed, in which a reference signal is superimposed on image signal in a fly-back period for controlling the bias voltage on the cathode of the CRT or the reference signal or the bias voltage on the grid G2 of the CRT such as to make the beam current in the CRT cathode to be constant by detecting the beam current in the reference signal period, while also obtaining brightness control. The image display comprises a stub pulse generator 2 for providing a stub on the black level side more than the image signal pedestal level, and an adder 3 for superimposing the stub pulse on the image signal. It is possible to change the reference signal voltage level to be on the black level side more than the image signal pedestal level, extend the brightness range, and obtain back luster float-up.

9 Claims, 7 Drawing Sheets

REFERENCE SIGNAL
(NEGATIVE POLARITY)

VARIABLE BLACK LEVEL BIAS IMAGE DISPLAY

BACKGROUND OF THE INVENTION

The present invention relates to a variable black level bias image display for video projectors and television receivers and, more particularly, to an image display, in which a reference signal is superimposed on an image signal in the horizontal or vertical fly-back time for feed-back control of the beam current in the CRT cathode by detecting the beam current in the reference signal period and also for a black level bias voltage control according to the signal level of the reference signal.

A prior art image display of the pertaining type has a circuit, which superimposes a reference signal on an image signal in the horizontal or vertical fly-back time for controlling the grid G1 or G2 or cathode of a CRT such as to make the cathode beam current therein constant by detecting the beam current in the reference signal period, as well as for brightness control.

Figure 6:
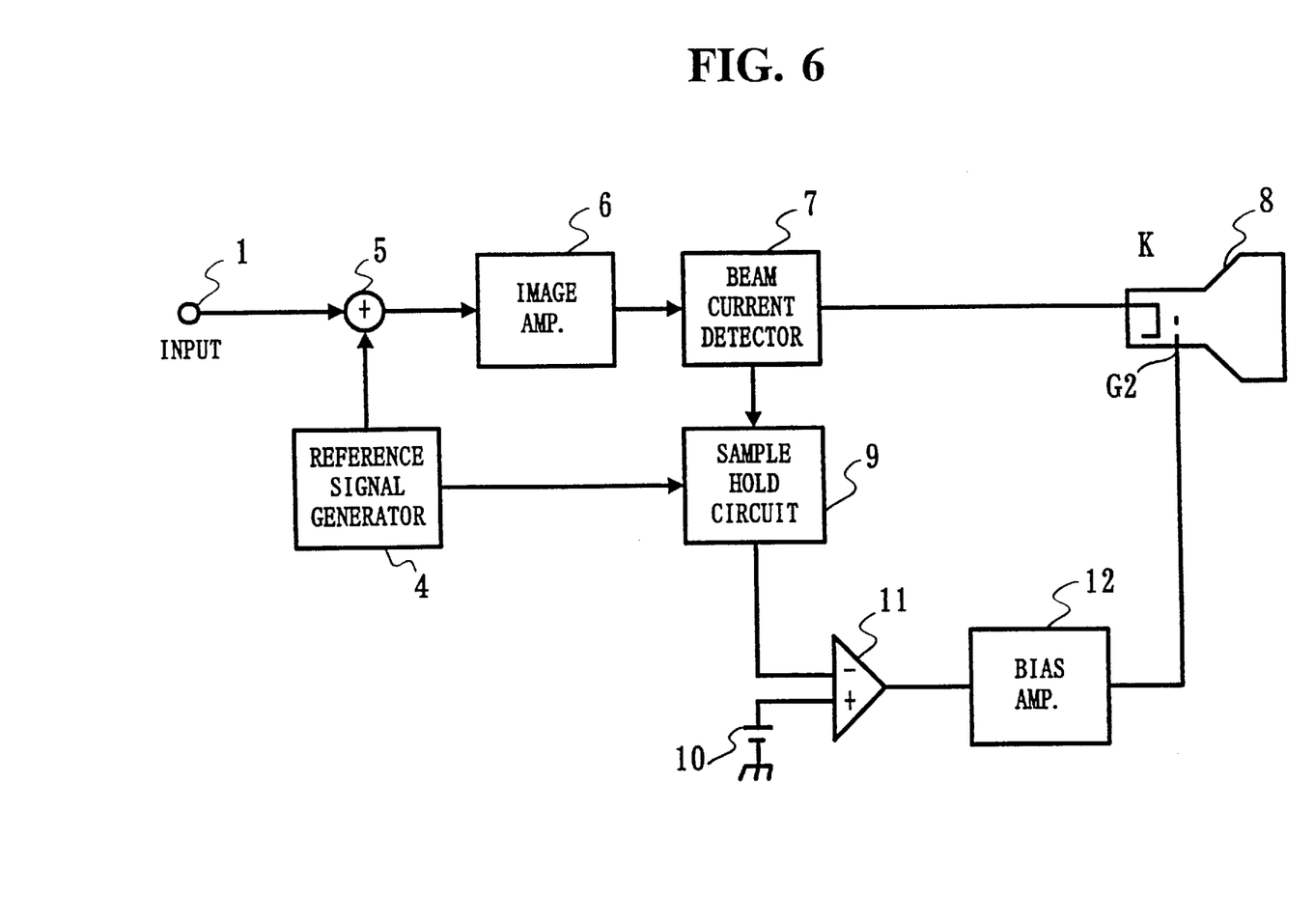
FIG. 6 shows a block diagram showing a prior art image display circuit.
Figure 7:
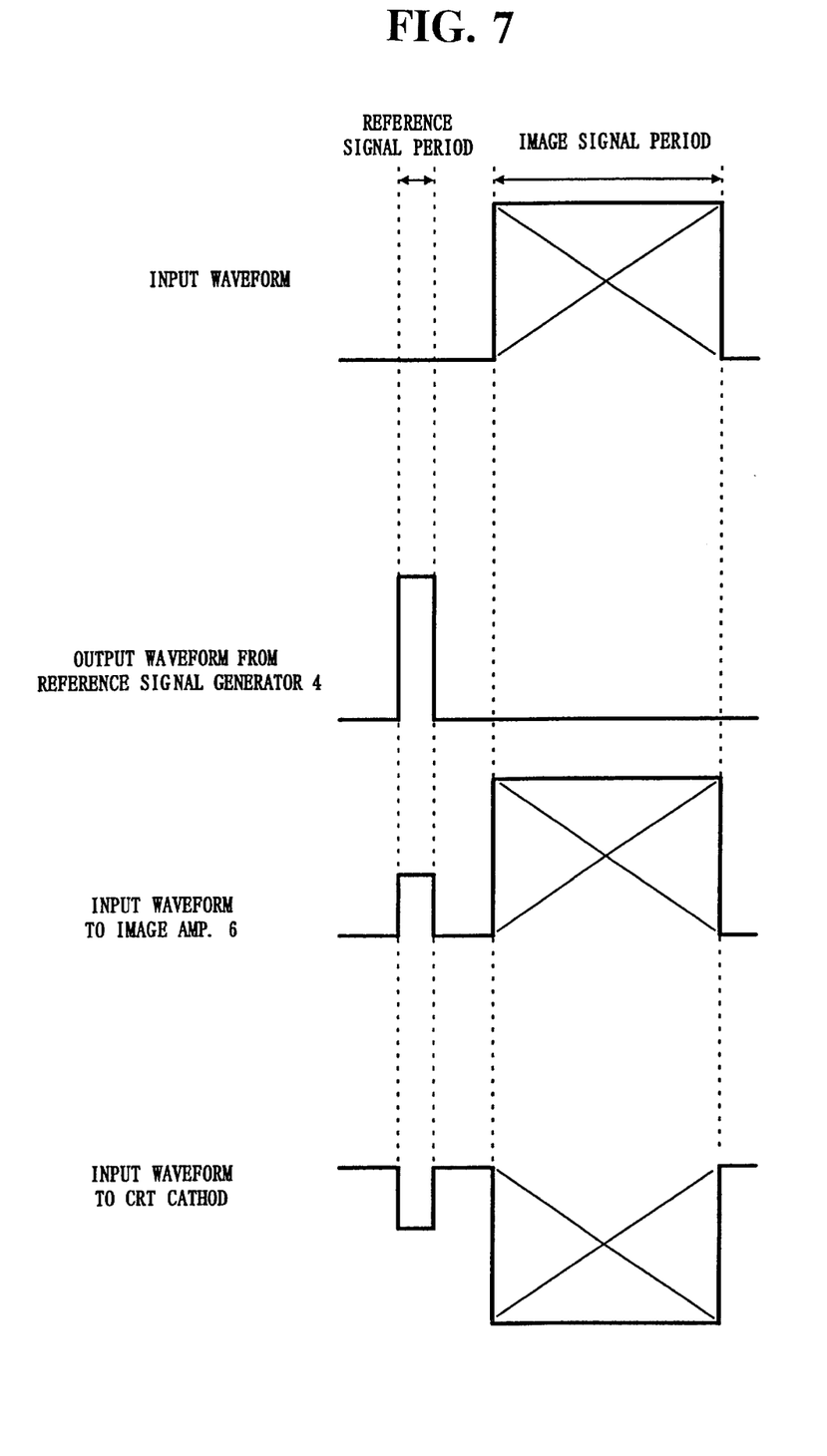
FIG. 7 shows a waveform chart showing waveforms appearing in various parts of the circuit shown in FIG. 6.

FIG. 6 is a block diagram showing a prior art image display circuit. FIG. 7 is a waveform chart showing waveforms appearing in various parts of the circuit shown in FIG. 6.

An image signal is inputted to an input terminal 1. A reference signal generator 4 outputs a reference signal during the horizontal or vertical fly-back time. An adder 5 superimposes the reference signal on the image signal. An image amplifier 6 amplifies the output of the adder 5, i.e., the image signal with the reference signal added thereto. The amplified image signal is coupled through a beam current detector 7 to the cathode of a CRT 8.

The beam current detector 7 detects a beam current flowing through the cathode of the CRT 8, and converts the detected beam current into a corresponding voltage. The converted voltage is fed to a sample-hold circuit 9. The sample-hold circuit 9 samples the converted voltage at the timing of the input of the reference signal from the reference signal generator 4, and holds the sampled voltage until the input of the next reference signal.

The sampled and held voltage is fed to an inverted input terminal of a voltage comparator 11. A reference voltage 10 is applied to a non-inverted input terminal of the voltage comparator 11. The voltage comparator 11 compares the voltages at the inverted and non-inverted input terminals, and feeds a voltage corresponding to the difference to a bias amplifier 12. The bias amplifier 12 feeds an output signal to the grid G2 of the CRT 8.

The operation of the above image display circuit will now be descried.

The reference signal provided from the reference signal generator 4 is added to the input image signal. The resultant image signal is amplified in the image amplifier 6 to a prescribed voltage level. The amplified signal is coupled through the beam current detector to the cathode of the CRT 8. A beam current corresponding to the coupled signal is caused to flow through the cathode of the CRT 8. The beam current detector 7 detects the beam current and converts the detected beam current into a voltage. The converted voltage is fed to the sample/hold circuit 9. The sample/hold circuit 9 samples the converted voltage in the reference signal period in correspondence to the timing of the reference signal. The sampled voltage is held until the input of the next reference signal. The voltage that is held is fed to the inverted input terminal of the voltage comparator 11.

The reference voltage 10 is applied to the non-inverted input terminal of the voltage comparator 11. The voltage comparator 11 provides the difference voltage to the bias amplifier 12. The bias amplifier 12 feeds an output signal to the grid G2 of the CRT 8.

When the sampled voltage is higher than the reference voltage 10, the voltage comparator 11 reduces the output voltage, thus reducing the output of the bias amplifier 12 to reduce the beam current. On the other hand, when the sampled voltage is lower than the reference voltage 10, the voltage fed to the grid G2 is increased to increase the beam current. It will be seen that the voltage comparator 11 functions to make the sampled voltage to be equal to the reference voltage.

Figure 8A:
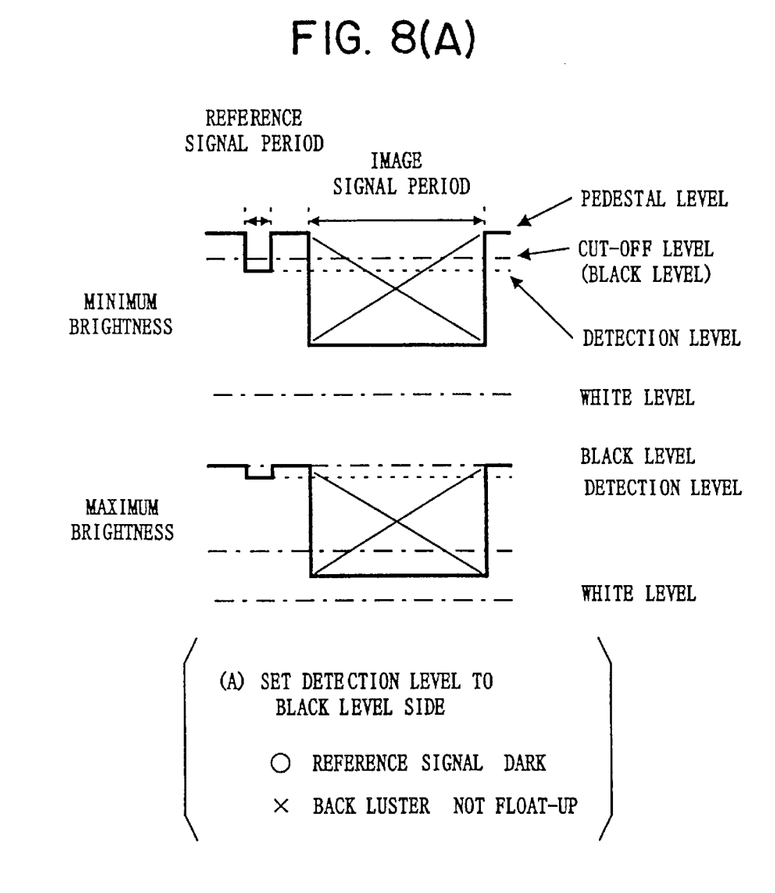
FIGS. 8(A) and 8(B) show the relation between the cathode voltage amplitude and the brightness when the amplitude of the reference signal in the above image display circuit is controlled.
Figure 8B:
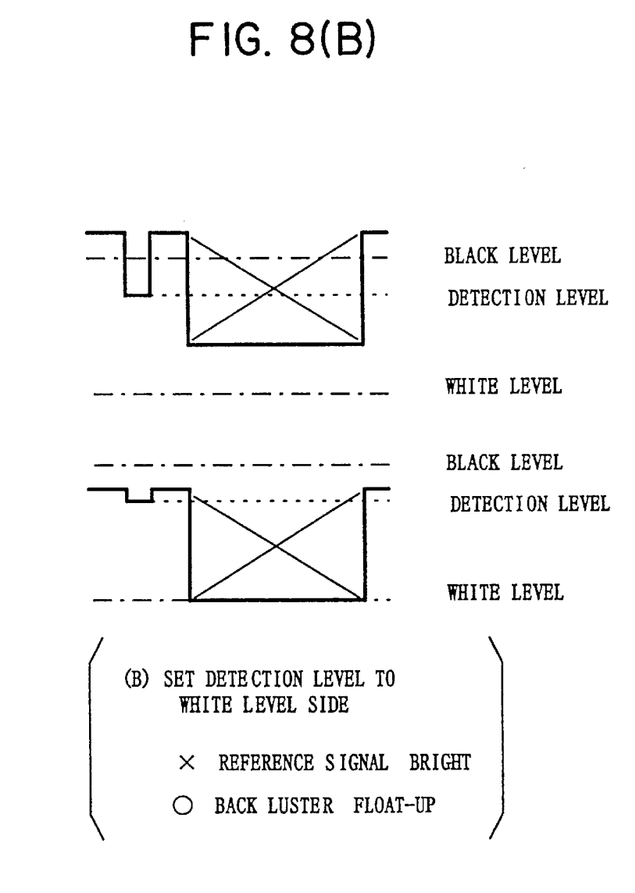

FIGS. 8(A) and 8(B) show the relation between the cathode voltage amplitude and the brightness when the amplitude of the reference signal in the above image display circuit is controlled. By increasing the amplitude of the reference signal, the image is caused to sink to the black level side. By reducing the amplitude of the reference signal, on the other hand, the image floats up to the white level side. In this way, the brightness control is obtained.

The above prior art image display had the following problem.

Referring to FIGS. 8(A) and 8(B), when the detected level of the reference signal is set to the vicinity of the black level (i.e., cut-off level) (FIG. 8(A)) by reducing the reference voltage 10 for making the reference signal to be dark, the maximum brightness point on the screen is one, at which the reference signal coincides with the image signal pedestal level. Since the image signal pedestal level is substantially the same as the black level, no back luster float-up can be obtained, and the brightness range is insufficient.

When the detected level of the reference signal is set to be on the white level side more than the black level (FIG. 8(B)) by increasing the reference voltage 10, the maximum brightness at this time is one, at which the image signal pedestal level is on the white level side more than the black level. Thus, the back luster float-up can be obtained, and the brightness range is sufficient. However, since the detected level of the reference signal is shifted to the white level side, the reference signal provides a bright image.

That is, by making the image brighter, i.e., providing a sufficient brightness range, the reference signal provides a considerably bright image. This is so for the following reason. To detect the beam current, it is necessary to cause the beam current to flow through the CRT 8. By causing the beam current, the CRT 8 becomes bright. This is why the reference signal provides a bright image.

Well-known image displays are disclosed in Japanese Laid-Open Patent Publication No. 56-007575 and Japanese Laid-Open Utility Model Publication No. 56-114171 (both published on 1981). These techniques seek to suppress the CRT beam current when an excessive input signal appears. To this end, the amplification factor concerning the image signal or the clamp level is controlled. Therefore, in these cases the reference screen brightness or shade is varied. For this reason, it has been inevitable to adopt the image display circuit as described above for permitting brightness control by holding fixed brightness or shade.

SUMMARY OF THE INVENTION

The present invention was made in view of the above problem, and it has an object of providing an image display apparatus, which permits brightness control while holding fixed brightness or shade and also expanding the brightness range while making the reference signal image to be less noticeable.

According to a first aspect of the present invention, there is provided a video display in which a reference signal in the form of a pulse signal having a predetermined peak value is superimposed on an image signal during a fly-back time to set a black level bias voltage according to the reference signal peak value comprising a reference signal level shift means for shifting the voltage level of the reference signal to be on the black level side more than the image signal pedestal level.

By superimposing the pulse signal having the predetermined peak value on image signal during a fly-back time to set a black level bias voltage according to the reference signal peak value, the reference signal level shift means is caused to shift the reference signal voltage level to be on the black level side more than the image signal pedestal level. Thus, the image signal pedestal level is high, while the detected level of the reference signal is low. The white level which is determined according to this high image signal pedestal level, is thus sufficiently high. Besides, since the reference signal is detected at a sufficiently low level, it does not provide any bright image in the fly-back time.

According to a second aspect of the present invention, there is provided the image display according to the first aspect, wherein the reference signal shift means includes stub pulse superimposing means for superimposing a pulse having a longer period than and the opposite polarity to the pulse-form reference signal.

With the superimposition of a pulse having a longer period than and the opposite polarity to the reference signal by the stub pulse superimposing means, it is possible to shift the reference signal voltage level to be on the black level side more than the image signal pedestal level.

According to a second aspect of the present invention, there is provided the image display according to the first aspect, which further comprises a negative reference signal generating means for changing the reference signal to a negative signal.

The reference signal which is changed by the negative reference signal generating means to be a negative signal, projects on the negative side more than the image signal pedestal level. Thus, a high image signal pedestal level, and hence a sufficiently high white level, can be obtained even by reducing the detected level of the reference signal.

According to a second aspect of the present invention, there is provided the image display according to the first aspect, which further comprises time-division basis signal switching means for switching the reference signal and the image signal over to each other on a time-division basis.

With the time-division signal switching means for switching the reference signal and the image signal over to each other on a time-division basis, the reference signal voltage level can be utilized separately from the image signal voltage level. Thus, it is possible to obtain a sufficiently high white level by increasing the image signal pedestal level while reducing the detected level of the reference signal. In addition, it is possible to obtain brightness control according to the amplitude of the reference signal.

Other objects and features will be clarified from the following description with reference to attached drawings.

PREFERRED EMBODIMENTS OF THE INVENTION

Preferred embodiments of the present invention will now be described will now be described with reference to the drawings.

Figure 1:
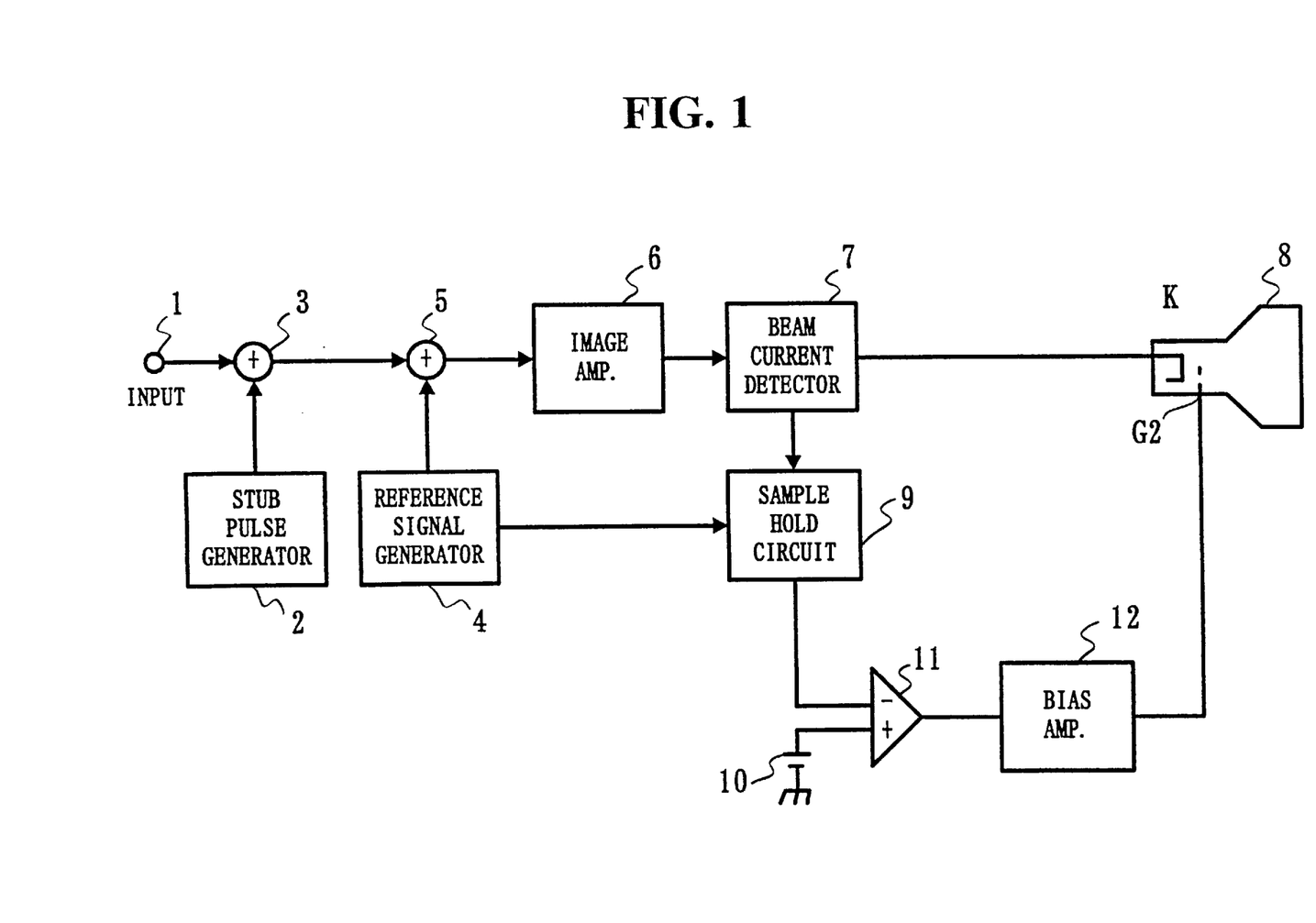
FIG. 1 is a block diagram showing an embodiment of the image display according to the present invention.
Figure 2:
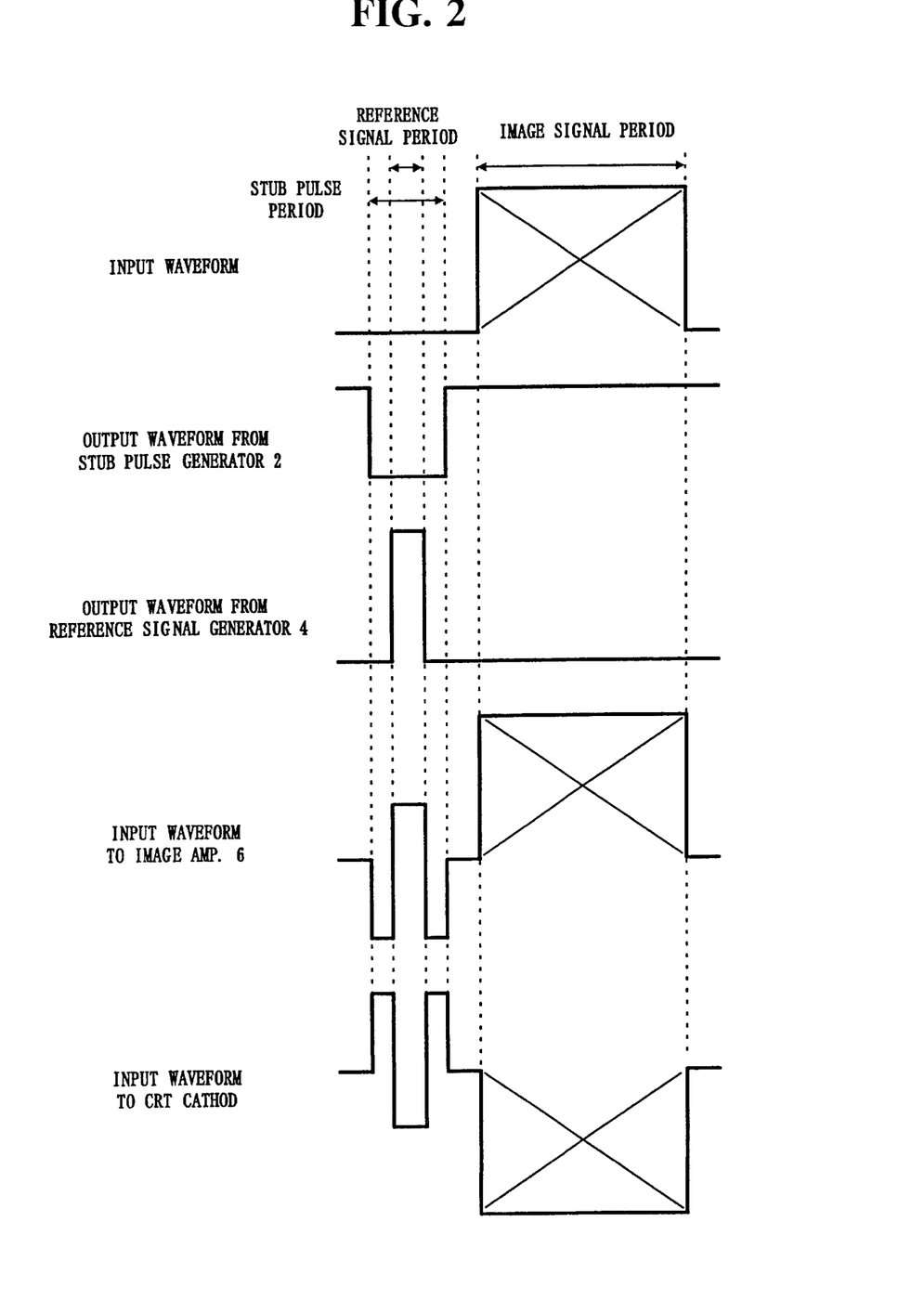
FIG. 2 shows waveforms on the portions of the image display in FIG. 1.

FIGS. 1 and 2 are a block diagram showing an embodiment of the image display according to the present invention and waveforms on the portions of the image display in FIG. 1.

An image signal is inputted to an input terminal 1. Hereinafter, it is assumed that the input image signal is a positive signal. A stub pulse generator 2 provides a negative pulse, which has a pulse period equal to the vertical interval time code, in the horizontal fly-back time. If the pulse period of the stub pulse is set to be shorter than the pulse period of the reference signal, the reference signal cannot be normally superimposed. On the other hand, if the pulse period of the stub pulse is set to be longer than the vertical blanking time, the image signal is adversely affected. Here, the pulse period of the stub pulse is set to be equal to the vertical interval time code to delete the vertical fly-back and provide for back luster float-up.

The stub pulse is superimposed on the image signal. The reference signal generator 4 provides a positive reference signal of 1 H (horizontal cycle) during the stub pulse period. The reference signal appears as an image, so that its period is desirably as short as possible. If its period is too short, however, the frequency characteristic of the beam current detector 7 should be raised. Thus, the pulse period of the stub pulse is set to be in the above range to obviate the necessity of raising the beam current detector frequency characteristic.

The above arrangement in which the level of the reference signal is made to be lower than the pedestal level of the image signal by superimposing the opposite polarity stub pulse having a predetermined pulse period on the reference signal, constitutes a reference signal level shift means.

While in this embodiment the stub pulse is superimposed to shift the reference signal level to be on the black level side more than the pedestal level, this is by no means limitative.

Figure 4:
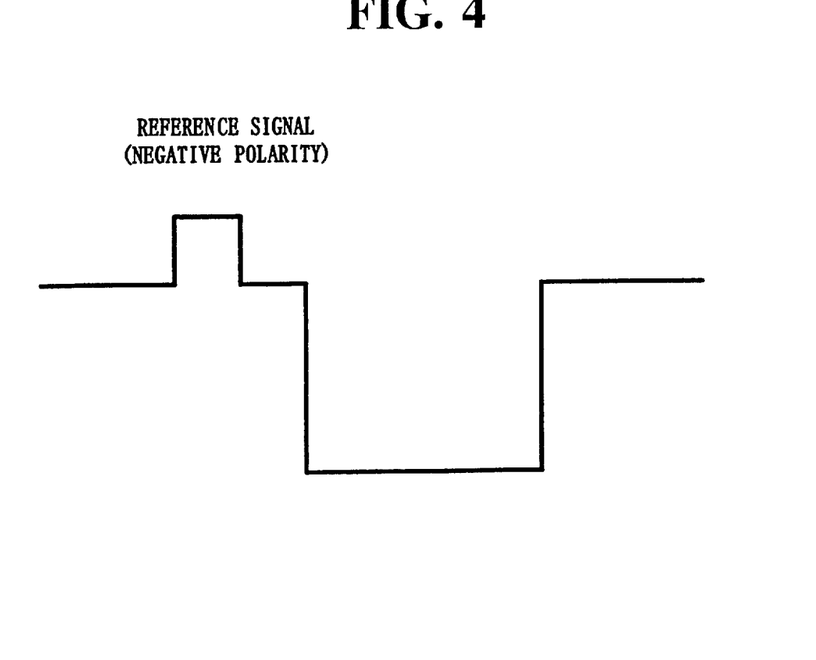
FIG. 4 shows an example of the reference signal changing from positive to negative signal.

For example, the reference signal may be changed from positive to negative signal. More specifically, as shown in FIG. 4, no stub pulse is superimposed, and the reference signal is impressed as a negative signal instead of the positive signal. By so doing, the reference signal level can be more reliably shifted to be on the black level side more than the image signal pedestal level.

Figure 5:
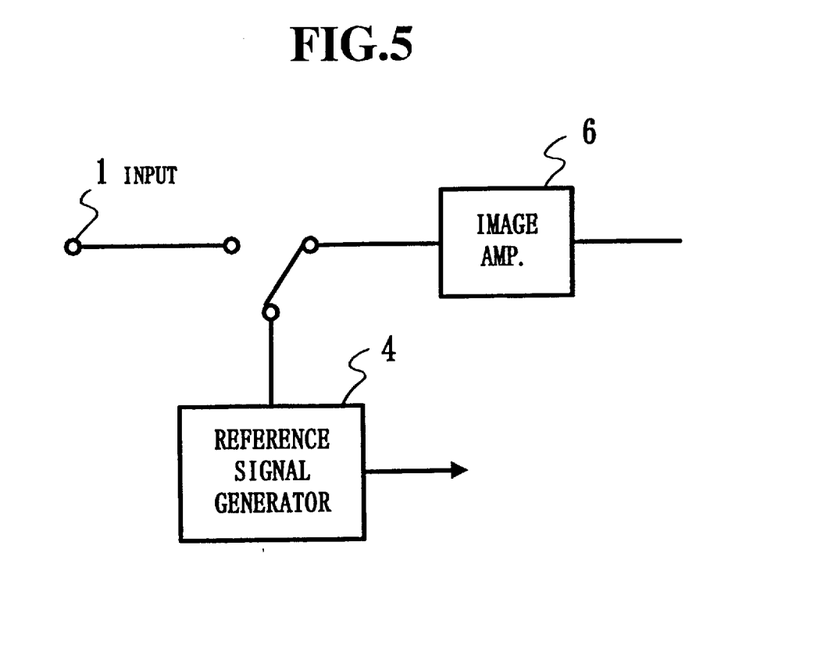
FIG. 5 shows a block diagram for switching the image signal and the reference signal on a time-division basis.

As another example, as shown in FIG. 5, the image signal and the reference signal can be switched over to each other on a time-division basis using a switch 13. With this arrangement it is possible to utilize a reference signal level, which is set to be on the black level side more than the image signal pedestal level.

The reference signal is desirably generated right after the end of the vertical interval time code. If the reference signal is present in the vertical interval time code, it appears as oblique lines on the screen. Also, if it is too close to the image period, it appears as horizontal lines. In either case, the display is uncomfortable to the eyes. Of course, with a pulse period longer than 1 H, an effect of image convergence correction may overlap the image in the horizontal fly-back time, and this is uncomfortable to the eyes.

The reference signal is superimposed on the stub pulse which has been superimposed on the image signal. The image amplifier 6 amplifies the image signal with the superimposed stub pulse and reference signal. The amplified output is coupled through the beam current detector 7 to the cathode of the CRT 8.

The beam current detector 7 detects the beam current flowing through the cathode of the CRT 8 and converts the detected beam current into a corresponding voltage, which is fed to the sample/hold circuit 9. The sample/hold circuit 9 samples the converted voltage during the period of the reference signal of the reference signal inputted from the reference signal generator 4 in correspondence to the timing of the reference signal, and holds the sampled voltage until the input of the next reference signal.

The voltage that is held is fed to the inverted input terminal of the voltage comparator 11, while the reference voltage 10 is applied to the non-inverted input terminal of the voltage comparator 11. The voltage comparator 11 compares the voltages at the non-inverted and inverted terminals, and feeds a voltage corresponding to the difference to the bias amplifier 12. The bias amplifier 12 amplifies the difference voltage, and feeds the amplified output to the grid G2 of the CRT 8.

The operation of the embodiment having the above construction will now be described.

A stub pulse provided from the stub pulse generator 2 is superimposed on the image signal inputted from the input terminal 1, and then a reference signal provided from the reference signal generator 4 is superimposed. The resultant signal is amplified in the image amplifier 6 to a prescribed voltage level to be coupled through the beam current detector 7 to the cathode of the CRT 8.

When a beam current corresponding to its input signal flows thorough the cathode of the CRT 8, the beam current detector 7 detects the beam current, and converts the detected beam current onto a voltage which is fed to the sample-hold circuit 9. The sample/hold circuit 9 samples the converted voltage during the reference signal period in correspondence to the timing of the reference signal, and holds the sampled signal until the input of the next reference signal.

The voltage comparator 11, which receives the sampled and held voltage inputted to its inverted input terminal and the reference voltage 10 applied to the non-inverted input terminal, feeds a voltage corresponding to the difference to the bias amplifier 12. When the sampled and held voltage is higher than the reference voltage 10, the output voltage of the voltage comparator 11 is reduced to reduce the output of the bias amplifier 12 so as to reduce the voltage at the grid G2, thus reducing the beam current.

When the sampled and held voltage is lower than the reference voltage 10, on the other hand, the voltage at the grid G2 is increased to increase the beam current. In this way, the voltage comparator 11 functions to make the sampled and held voltage to be equal to the reference voltage.

Figure 3:
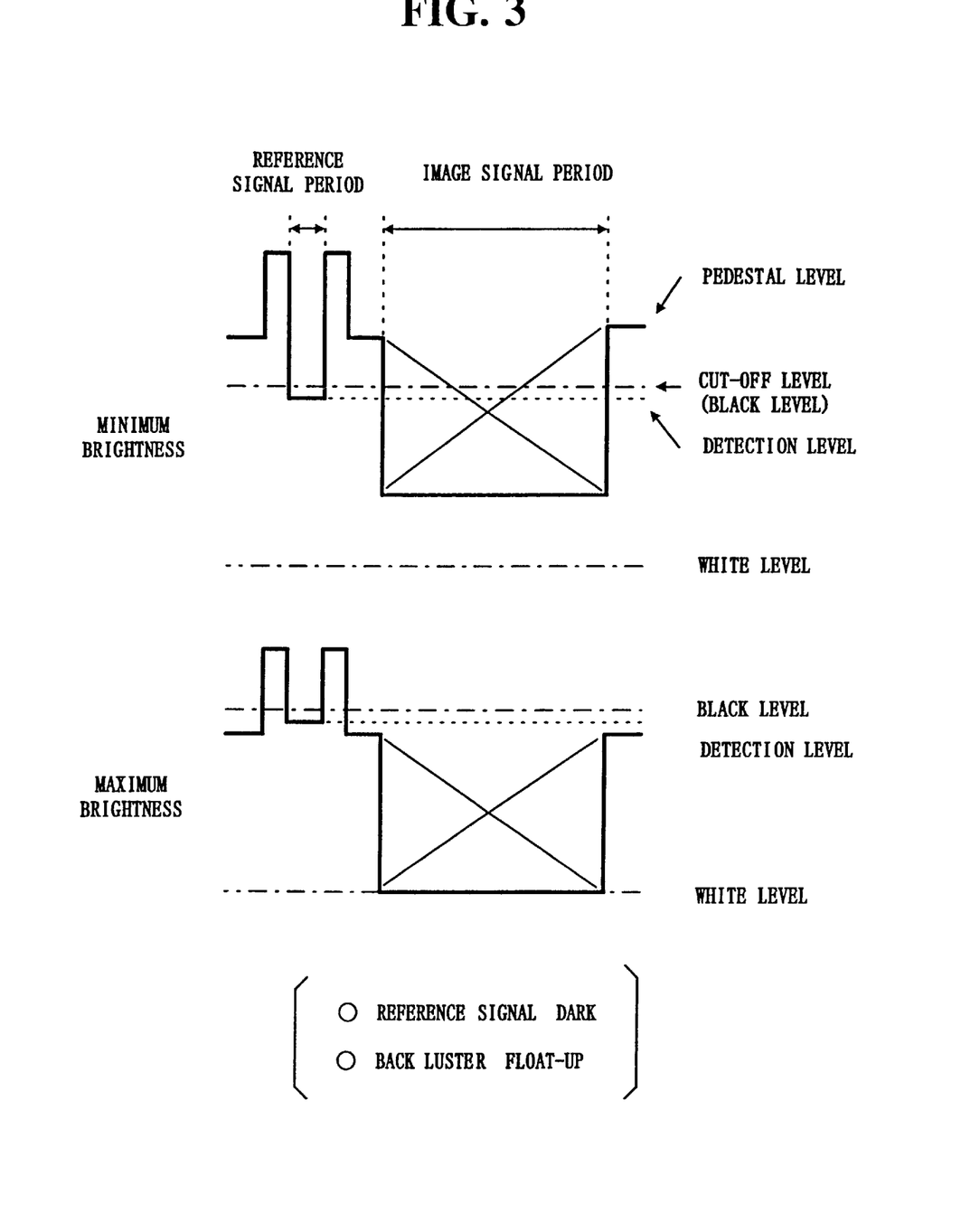
FIG. 3 shows the relation between the cathode voltage amplitude and the brightness when the amplitude of the reference signal in this image display circuit is adjusted.

FIG. 3 shows the relation between the cathode voltage amplitude and the brightness when the amplitude of the reference signal in this image display circuit is adjusted.

To make the reference signal dark, the detected level of the reference signal is set to the vicinity of the black level (i.e., cut-off level) by reducing the reference voltage 10. Since in this embodiment the stub pulse is superimposed, the reference signal level is changed such that it is on the black level side more than the image signal pedestal level. Thus, it is brought about that the image signal pedestal level is on the white level side more than the black level (i.e., cut-off level). Back luster float-up is thus obtained.

By increasing the amplitude of the reference signal, a beam current is detected and voltage converted during the reference signal period. The voltage on the grid G2 is thus reduced to make the sampled and held voltage to be equal to the reference voltage 10. As a result, the image is caused to sink to the black level side. By reducing the amplitude of the reference signal, the image is this time changed to the white level side. In this way, the brightness control can also be obtained.

In this embodiment of the present invention the bias voltage on the grid G2 of the CRT 8 is controlled, but it is also possible to control the bias voltage on the cathode of grid G1.

As shown above, the image display according to the present invention, in which a reference signal is superimposed on the image signal in a fly-back period for controlling the bias voltage on the cathode of the CRT or the reference signal or the bias voltage on the grid G2 of the CRT such as to make the beam current in the CRT cathode to be constant by detecting the beam current in the reference signal period, while also obtaining brightness control, comprises a stub pulse generator 2 for providing a stub on the black level side more than the image signal pedestal level, and an adder 3 for superimposing the stub pulse on the image signal. It is thus possible to shift the reference signal voltage level to be on the black level side more than the image signal pedestal level, extend the brightness range, and obtain back luster float-up.

As has been described in the foregoing, according to the present invention it is possible to provide an image display, in which a high image signal pedestal level can be set while reducing the detected level of the reference signal, thus permitting a sufficiently high white level to be provided and also preventing the reference signal from preventing a bright image in the interval time code. According to the second aspect of the present invention, only a stub pulse having a longer pulse period than and the opposite polarity to the reference signal is superimposed on the reference signal. It is thus possible to simplify the construction. According to the third aspect of the present invention, the sole reference signal is utilized as a negative signal. It is thus possible to further simplify the construction. According to the fourth aspect of the present invention, the voltage levels of the reference signal and the image signal can be dealt with independently, and it is thus possible to improve the freedom of the voltage level setting.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A video display in which a reference signal in the form of a pulse signal having a predetermined peak value is superimposed on an image signal during a fly-back time to set a black level bias voltage according to the reference signal peak value, comprising a reference signal level shift means for shifting the voltage level of the reference signal to be on the black level side more than the image signal pedestal level.

2. The image display according to claim 1, wherein the reference signal shift means includes stub pulse superimposing means for superimposing a pulse having a longer period than and the opposite polarity to the pulse-form reference signal.

3. The image display according to claim 1, which further comprises a negative reference signal generating means for changing the reference signal to a negative signal.

4. The image display according to claim 1, which further comprises time-division basis signal switching means for switching the reference signal and the image signal over to each other on a time-division basis.

5. An image display comprising:
   a stub pulse generator for generating a negative pulse having the pulse period equal to a vertical interval time code in the horizontal fly-back time to delete the vertical fly-back and provide for back luster float-up;
   a first adder for adding the stub pulse generated from the stub pulse generator to the image signal;
   a reference signal generator for generating a positive reference signal of the horizontal cycle during the stub pulse period;
   an image amplifier for amplifying the image signal with the superimposed stub pulse and reference signal;
   a beam current detector for detecting the beam current flowing through a cathode of a CRT 8 and converting the detected beam current into a corresponding voltage;
   a sample/hold circuit for sampling the converted voltage during the period of the reference signal inputted from the reference signal generator in correspondence to the timing of the reference signal, and holding the sampled voltage until the input of the next reference signal;
   a voltage comparator for comparing the output of sample/hold circuit and a reference voltage to generating a difference signal; and
   a bias amplifier for amplifying the difference signal to feed the amplified output to a grid of the CRT.

6. The image display as set forth in claim 5, wherein the stub pulse is added by the first adder to shift the reference signal level to be on the black level side more than the pedestal level.

7. The image display as set forth in claim 5, wherein the image signal and the reference signal can be switched over to each other on a time-division basis.

8. The image display as set forth in claim 5, wherein the reference signal is generated right after the end of the vertical interval time code.

9. An image display in which a reference signal is superimposed on an image signal in a fly-back period for controlling a bias voltage on a cathode of a CRT or a reference signal or a bias voltage on a grid of the CRT such as to make the beam current in the CRT cathode to be constant by detecting the beam current in the reference signal period, while also obtaining brightness control, the image display comprising a stub pulse generator for providing a stub on the black level side more than the image signal pedestal level, and an adder for superimposing the stub pulse on the image signal.

* * * * *